Nov. 18, 1924.

J. R. STEEL 1,515,907

PROCESS FOR SMELTING AND REDUCING ORES

Filed Sept. 26, 1922

Inventor.
JOHN R. STEEL.
By Dewey, Strong,
Townsend and Loftus
Attorneys.

Patented Nov. 18, 1924.

1,515,907

UNITED STATES PATENT OFFICE.

JOHN R. STEEL, OF SAN FRANCISCO, CALIFORNIA.

PROCESS FOR SMELTING AND REDUCING ORES.

Application filed September 26, 1922. Serial No. 590,712.

*To all whom it may concern:*

Be it known that I, JOHN R. STEEL, a citizen of the United States, residing at the city and county of San Francisco and State of California, have invented new and useful Improvements in Processes for Smelting and Reducing Ores, of which the following is a specification.

This invention relates to a process for extracting metals from oxidized ores and especially to a method for smelting and reducing the same.

The process is adapted for use on various metallic ores and it is particularly intended for the manufacture of pig-iron and iron alloys of a low carbon content.

To thoroughly understand the problems and difficulties involved and why no practical results have been obtained when fuels, other than coke, are employed as a smelting and reducing agent in the manufacture of pig-iron and the like, it is necessary to bear in mind a few of the re-actions which take place in a common blast furnace. The ore to be treated in a blast furnace is as a rule mixed with the right quantities of limestone (as a flux) and coke (as a fuel and a reducing agent). This mixture of ore, limestone and coke is dropped in at the top of the furnace from time to time. The heated air forced through the tuyères comes in contact with the burning coke and forms carbon dioxide, which is immediately reduced to carbon monoxide by the excess of carbon, the carbon monoxide forming the reducing agent which liberates the free irons or pig. Simultaneously with the reduction of the ferric oxidized or iron ore, some of the silica is reduced to silicon, and sulphur and phosphorous are also reduced. The iron takes up some of these elements and from 3 to 4½ per cent of carbon. This impure iron or alloy settles to the bottom of the furnace and is drawn off as a stream of molten metal from time to time; the product obtained being known as pig or cast-iron. The flux of limestone mentioned combines with the silica, alumina and other earthy impurities in the ore and forms double silicates of calcium and aluminum known as slag, a glassy substance which remains fluid at the high temperature of the furnace, this being separately removed through openings formed for the purpose. The blast furnace method of reduction is the only economical method of smelting and reducing iron ores known and in use today. Many attempts have been made to smelt and reduce by gas and also by crude oil, but all have proved an economical failure.

When considering the operation of a blast furnace, the ore mixed with the required amount of flux and carbon is deposited in the upper portion of the furnace. The whole mass gradually settles as reduction and smelting take place and the mixture of ore, flux and carbon will thus gradually pass through different temperature zones, and iron oxide ore is most efficiently reduced at temperatures ranging from 400 to 800 degrees centigrade. This temperature is reached near the upper end of the furnace and it may therefore be stated that the ore is first pre-heated, and secondly reduced when the temperature mentioned is reached; the reduction taking place when the carbon monoxide combines with the oxygen contained in the ore. Reduction of ore at this temperature produces what is termed an iron sponge and this sponge is finally smelted when the hottest zone of the furnace is reached, and it may furthermore be stated that it is smelted in a reducing atmosphere. The ore when in the sponge state has a great affinity for oxygen and has a tendency to re-oxidize when in this condition and it is for this reason that failures are generally met when attempts are made to smelt and reduce by fuels other than coke.

The object of the present invention is, first, that of smelting the ore without attempting reduction; secondly, avoiding and positively preventing the formation of iron sponge, and thirdly, reducing the ore while in a molten condition and in a reducing atmosphere. The operation of my process and the apparatus employed are illustrated by reference to the accompanying drawings, in which—

Figure 1:
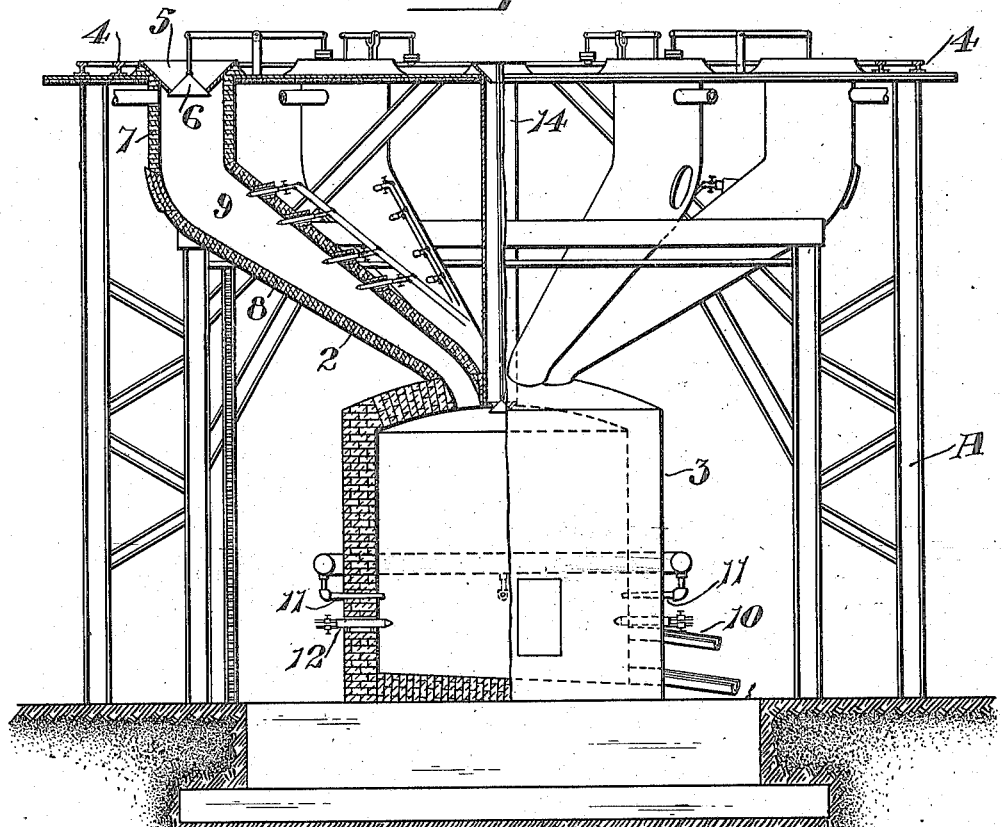
Fig. 1 is a side elevation of the furnace partly in section.
Figure 2:
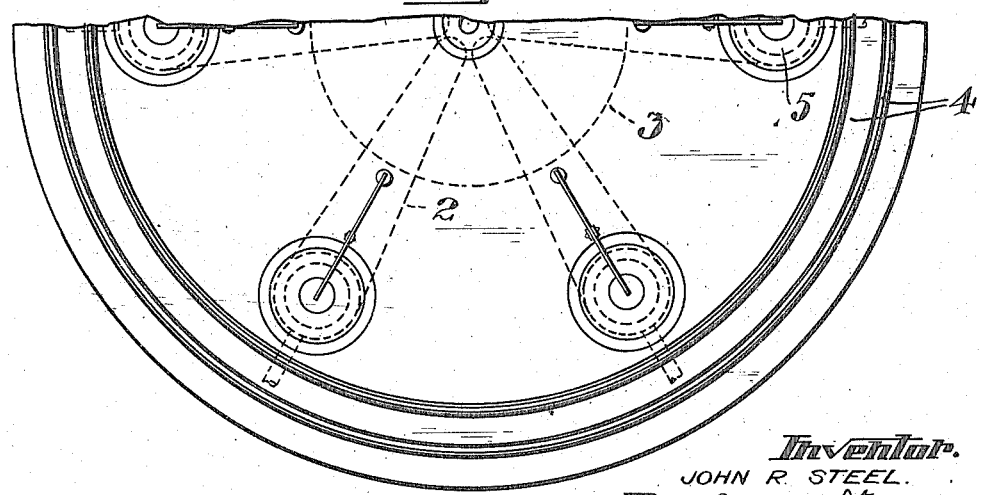
Fig. 2 is partial plan view of the same.

Referring to the drawings in detail, and particularly to Fig. 1, A indicates a frame of suitable construction by which is supported a series of smelting furnaces 2, the lower ends of which terminate and connect with a centrally disposed reducing furnace indicated at 3. The frame A is circular in formation as shown in the plan view and supports a circular track 4 about which trucks or cars may be moved containing the proper mixture of ore, lime, etc. The upper ends of the furnaces 2 are disposed within the track and the contents of the cars may therefore be dumped directly into the same. The furnaces 2 are radially disposed with relation to the central reducing furnace 3 and any suitable number may be employed. The upper end of each furnace 2 is provided with a receiving hopper 5 and a gate 6 whereby admission of the ore and flux may be controlled, and whereby the upper ends of each furnace may also be closed. The upper end of each furnace 2 is vertically disposed as shown at 7, and the lower ends or major portion are disposed on an angle as shown at 8, the terminal or lower ends communicating with the reducing furnace 3 so that the smelted ore may be delivered directly thereto for reducing purposes as will hereinafter be described. Each furnace 2 may be constructed in any suitable manner, that is lined with a refractory material and jacketed with steel and also water cooled, if desired, but as such a structure depends upon the particular use of the furnace, it is obvious that this may be changed to suit varying conditions. Each furnace 2 is provided with a series of burners 9, which are so constructed that oxygen gas and oil may be injected through the same. The oxygen and the oil combine and form an intense temperature whereby the ore and lime are rapidly smelted without the formation of a sponge and without much attempt of any reducing action. The iron ore and the slagging agent employed settle in a manner similar to the ore in an ordinary blast furnace and when they reach the smelting point they discharge into the upper end of the reducing furnace 3. This furnace is filled with coke which is employed as a reducing agent and final reduction will here take place. The iron liberated settles to the bottom where it is drawn off in the usual manner, while the slag forms on top and is removed through separate openings as indicated at 10. The reducing furnace is provided with the usual tuyères through which hot air is admitted through nozzles such as indicated at 11 and the reducing furnace is also provided with a suitable number of combined oil and oxygen burners such as indicated at 12. The present furnace is known as a multiple smelting and reducing furnace, that is a series of auxiliary furnaces is employed in which smelting of the ore alone is attempted, and it is provided with a single furnace 3 which is employed for reducing purposes only. The smelting furnaces are, however, in direct communication with the reducing furnace and as such continuous operation may be effected and large capacities taken care of.

In actual operation the ore, together with the slagging agent, is entered through the upper hoppers indicated at 5, being delivered thereto by cars, which are carried by the track 4. With the burners 9 in operation, it can be seen that the ore will be subjected to an enormous temperature and as such will be rapidly reduced to a molten condition. This molten ore is delivered directly into the upper end of the reducing furnace 3, which is filled with coke as previously described. This coke is maintained in a glowing condition by means of the burners 12 and the hot air admitted through the nozzles 11, and as such forms a bed of incandescent coke through which the molten ore trickles before it reaches the lower portion of the furnace, from where it is tapped and removed in the usual manner; that is the oxygen of the ore has a great affinity for the carbon and as it trickles through the incandescent bed of coke, the reducing action takes place due to the fact that the oxygen combines with the carbon. The hot air admitted through the nozzles 11 helps to support combustion and it also forms a reducing agent as the air is immediately changed to carbon dioxide and then to carbon monoxide by the excessive carbon. This carbon monoxide passes upwardly through the several furnaces indicated at 2 and here produces a partial reducing action as it passes upwardly through the ore which has not reached the smelting point. In other words partial reduction takes place in the smelting furnaces 2, but the main and final reduction takes place when the molten ore trickles through the incandescent bed of coke. The coke is supplied from time to time by means of a central pipe 14 and a uniform layer may thus be obtained. It has previously been stated that the ore when in a spongy condition has a great affinity for oxygen and as such re-oxidizes unless maintained in a reducing atmosphere. A reducing atmosphere is maintained in this instance both in the reducing furnace 3 and in the smelting furnaces 2, due to the fact that the carbon monoxide formed escapes through the furnaces 2. No attempt however is made to reduce an iron sponge in this instance as the smelting operation is very rapid, but if any does form it is not detrimental due to the reducing atmosphere maintained.

An excess amount of air in any portion of the reducing furnace or the smelting furnaces is avoided by the use of oxygen supplied through the burners 9 and 12, and high temperatures are also obtained by the use of oxygen. The oxygen thereby insures complete combustion of the fuel oil employed and other advantages are also obtained; that is I have discovered by varying the quantity of oxygen gas admitted, it is possible to produce different products, to-wit, pig-iron, cast-iron, wrought-iron and steel. A comparatively small amount of pure oxygen gas admitted produces pig-iron, while a gradual increase in the amount of oxygen gas employed produces cast-iron, wrought-iron and steel. I have also found that different grades of steel can be obtained as the pure oxygen gas admitted reduces the carbon content of the iron or steel to any degree desired. Therefore by varying the amount of oxygen gas admitted, practically any grade of iron or alloy therefore may be obtained.

I am aware that many attempts have been made to smelt and reduce iron ore by employing crude oil as a fuel, but that these attempts have all been failures, that is most of the pig-iron produced when employing crude oil as a fuel seems to be too spongy and contains too much carbon, silica, phosphorous and sulphur. This defect is entirely overcome in the present instance as the carbon, silica and phosphorous combine with the oxygen of the oxide, the last two passing into the slag and also the sulphur which is generally found in the slag as a ferrous sulphide.

The pure oxygen gas employed in my process is an essential element for the successful production of the different products of iron and alloys thereof for by varying the amount of oxygen employed different grades may be obtained.

Another important feature of the invention is the use of a single reducing furnace, that is the crude oil is employed for heating and smelting purposes alone, while the coke is employed for reducing purposes only. This is of great importance, particularly on the Pacific Coast as crude oil is cheap and coke is comparatively expensive, and as coke is employed for reducing purposes only, very small quantities are required in the reduction of a large tonnage of ore.

Having thus described my invention, what I claim and desire to secure by Letters Patent is—

1. A process of smelting and reducing ores which consists in subjecting the ore to heat produced by the combustion of a carbonaceous fuel in the presence of substantially pure oxygen gas, smelting the ore by the heat produced, and then subjecting the smelted ore to a reducing agent.

2. A process of smelting and reducing ores which consists in smelting the ore by heat produced by the combustion of a hydrocarbon fuel and substantially pure oxygen gas, and then subjecting the smelted ore to a reducing agent.

3. A process of smelting and reducing oxidized ores which consists in smelting the ore in the flame produced by burning oil and substantially pure oxygen gas, and then subjecting the smelted ore to a reducing agent.

4. A process of smelting and reducing oxidized ores which consists in smelting the ore in the flame produced by burning oil and substantially pure oxygen gas, and then allowing the smelted ore to trickle through a bed of incandescent coke.

5. A process of smelting and reducing oxidized ores which consists in smelting the ore in the flame produced by burning oil and substantially pure oxygen gas, then allowing the smelted ore to trickle through a bed of incandescent coke, and maintaining said bed of coke in an incandescent condition by passing substantially pure oxygen gas therethrough.

JOHN R. STEEL.